Jan. 8, 1929.

F. JOHNSON

VALVE

Filed April 22, 1927

1,698,439

Inventor.
Francis Johnson
by Heard Smith & Tennant.
Attys.

Patented Jan. 8, 1929.

1,698,439

UNITED STATES PATENT OFFICE.

FRANCIS JOHNSON, OF SOMERVILLE, MASSACHUSETTS.

VALVE.

Application filed April 22, 1927. Serial No. 185,807.

This invention relates to valves and has for its object to provide a valve having a novel construction by which the valve stem will be more efficiently packed than is possible with the ordinary construction.

In order to give an understanding of the invention I have illustrated in the drawings a selected embodiment thereof which will now be described after which the novel features will be pointed out in the appended claim.

Figure 1:
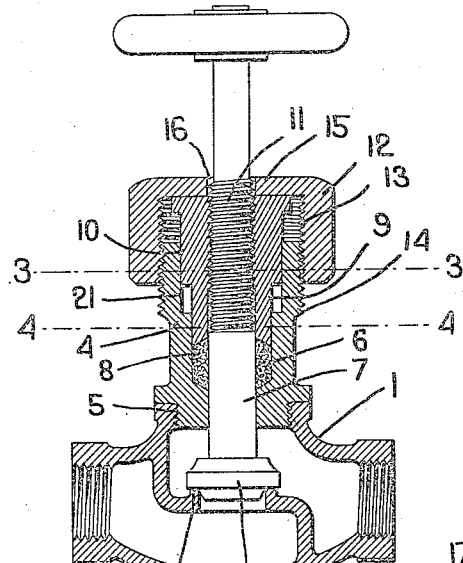
Fig. 1 is a sectional view of a valve embodying my invention.

My improved valve comprises the usual valve body 1 having within it a valve seat 2 on which the valve 3 is adapted to seat. 4 indicates a bonnet which is screw threaded to the valve body 1 as shown at 5. This bonnet is provided with a packing chamber 6 through which the valve stem 7 extends and which is adapted to receive the packing 8 by which the valve stem is packed. The bonnet also has slidably mounted therein a packing gland 9 by which the packing 8 is forced tightly around the valve stem. The packing gland 9 is held from rotation in the bonnet 4 but is capable of sliding in the axial direction of the valve stem for the purpose of tightening the packing 8.

Any convenient way of holding the packing gland from rotation may be employed. As herein shown said gland is formed with the V ribs 10 which fit corresponding grooves 21 formed in the bonnet. The valve stem 7 extends through the packing gland 9 and has screw-threaded engagement therewith, said valve stem being provided with the exterior screw threads 11 adapted to engage interior screw threads with which the bore of the gland 9 is provided. The gland 9 thus forms the anchoring member through which the valve stem screws for opening and closing the valve.

Figure 2:
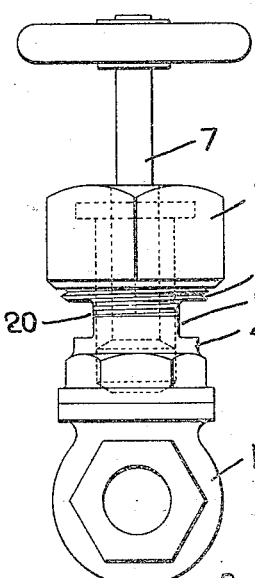
Fig. 2 is an end view thereof.

Said gland 9 is adjustably connected to the bonnet 4 so as to hold said gland from longitudinal movement during the operation of the valve. In Figs. 1 and 2 this connection is provided for by a clamping ring 12 which is provided with interior screw threads 13 adapted to engage exterior screw threads 14 formed on the bonnet, said ring having at its upper end the flange portion 15 that engages the end of the gland. The clamping ring 12 has an opening 16 therethrough of a size to freely receive the screw-threaded portion of the valve stem.

When the valve is closed tightly against its seat, as shown in Fig. 1, the pressure of the valve against the seat will have a tendency to force the gland 9 upwardly because of the screw-threaded engagement between the valve stem and the gland but this movement is resisted by the connection member 12. On the other hand, when the valve is fully opened and has been raised to a point in engagement with the under side of the bonnet then the strain on the gland due to its screw-threaded engagement with the valve stem is one tending to move the gland downwardly with the result that the packing 8 will tend to be tightened.

The operation of completely opening the valve, therefore, automatically tends to tighten the packing which is a desirable feature because it tends to prevent any leakage around the valve stem.

If it is desired to tighten the packing 8 the valve will be backed off from its seat and then the connecting nut or member 12 may be tightened on the bonnet 4, this operation forcing the gland downwardly and thus compressing the packing.

If it is desired to renew the packing the nut or connecting member 12 will be unscrewed from the bonnet 4 and the valve stem will then be turned in a direction to seat the valve. As soon as the valve has become seated then further turning movement of the valve stem will force the gland 9 upwardly and it may thus be removed from the bonnet thereby to permit the packing in the chamber 6 to be renewed.

Figure 5:
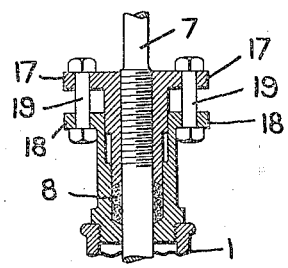
Fig. 5 is a view showing a different embodiment of the invention.
Figure 3:
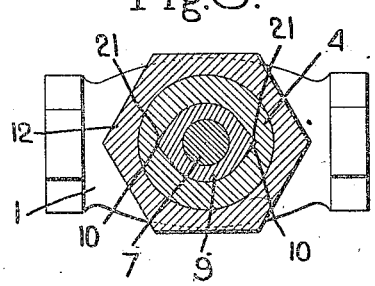
Fig. 3 is a section on the line 3—3, Fig. 1.

In lieu of the nut or clamping sleeve 12 for connecting the gland to the bonnet I may employ the construction shown in Fig. 5 wherein the gland is provided at its upper end with ears or lateral extensions 17 and the valve bonnet is provided with corresponding ears 18 and wherein these ears 17, 18 are connected by the clamping bolts 19. In other respects the construction shown in Fig. 5 is the same as that shown in Fig. 1.

Figure 4:
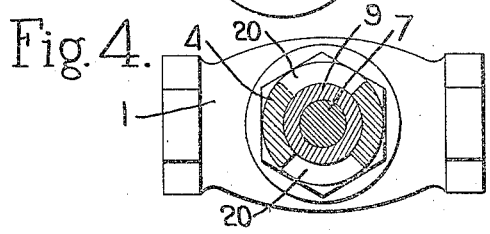
Fig. 4 is a section on the line 4—4, Fig. 1.

It will be remembered that the ribs 10 extend only part way of the length of the gland, the lower end of the gland being circular in cross section, as shown in Fig. 4. The bonnet 4 is provided with openings 20 on opposite sides above the chamber 6 in which the packing 8 is received. These openings are normally closed by the lower circular end of the packing gland 9. The purpose of these openings is to facilitate repacking the valve stem. To do this the member 12 is backed off and the gland is withdrawn sufficiently to uncover the openings 20 and when this is done added packing may be introduced into the chamber 6 through the openings 20 or the old packing may be removed and the chamber may be supplied with fresh packing. After the packing has been put in place the connection member 12 is screwed down thereby forcing the gland downwardly and covering the openings 20 and at the same time compressing the packing portions of the bonnets between the openings 20.

A valve embodying my invention has the advantage that the packing is located between the operating screw threads of the valve stem and the water chambers of the valve so that the packing prevents any possibility of water leaking along the valve stem and reaching the screw threads.

I claim:

A valve comprising a valve body having a valve seat, a valve co-operating with said seat, a bonnet screw threaded to the valve body and provided with a chamber, the lower end of which is cylindrical and is adapted to receive packing, and the upper end of which has two opposed grooves in its wall, packing occupying the lower cylindrical portion of said chamber, a packing gland which is cylindrical at its lower end and is adapted to fit the cylindrical portion of said chamber and to compress the packing therein, the upper portion of said gland having two opposed ribs fitting said grooves and extending above the bonnet, means connecting the bonnet and gland by which the gland may be adjusted relative to the bonnet to compress the packing, said gland having a screw-threaded bore therethrough, a valve stem connected to the valve and extending through the packing chamber and having exterior screw threads engaging the interior screw threads of the gland, said bonnet having openings through its walls above the lower end of the gland when the latter is in operative position and through which the valve stem may be repacked when the gland is partially removed from the bonnet.

In testimony whereof, I have signed my name to this specification.

FRANCIS JOHNSON.